United States Patent
Blunden

(10) Patent No.: US 12,144,332 B1
(45) Date of Patent: Nov. 19, 2024

(54) FISHING KNOT TYING JIG

(71) Applicant: David Blunden, Kingston (CA)

(72) Inventor: David Blunden, Kingston (CA)

( * ) Notice: Subject to any disclaimer, the term of this patent is extended or adjusted under 35 U.S.C. 154(b) by 119 days.

(21) Appl. No.: 18/075,491

(22) Filed: Dec. 6, 2022

(51) Int. Cl.
*A01K 91/04* (2006.01)

(52) U.S. Cl.
CPC .................................. *A01K 91/04* (2013.01)

(58) Field of Classification Search
CPC ........................................................ A01K 91/04
See application file for complete search history.

(56) References Cited

U.S. PATENT DOCUMENTS

| | | | |
|---|---|---|---|
| 2,843,961 A | 7/1958 | Mckenzie | |
| 2,943,650 A * | 7/1960 | Rubin | A61B 17/8861 140/120 |
| 2,964,069 A * | 12/1960 | Eugene | B21F 15/04 140/149 |
| 3,131,957 A * | 5/1964 | Musto | A01K 91/04 289/17 |
| 3,265,422 A * | 8/1966 | Pierce | A01K 91/04 289/17 |
| 4,613,173 A | 9/1986 | Rosser | |
| 4,714,281 A * | 12/1987 | Peck | A01K 91/04 289/1.5 |
| 5,647,616 A * | 7/1997 | Hamilton | A01K 97/06 289/17 |
| 5,666,760 A * | 9/1997 | Bramblett | A01K 91/04 43/42.49 |
| 5,791,699 A * | 8/1998 | High | D03J 3/00 289/17 |
| D572,095 S | 7/2008 | Jochum | |
| 7,419,195 B1 | 9/2008 | Jochum | |
| 7,475,510 B2 * | 1/2009 | Franklin | A01K 95/02 43/44.9 |
| 7,666,196 B1 * | 2/2010 | Miles | A61B 17/0469 606/144 |
| 8,511,722 B1 | 8/2013 | Farner | |
| 9,185,894 B1 | 11/2015 | Almubaelesh | |
| 10,383,323 B2 | 8/2019 | Hamell | |
| 2007/0044369 A1 * | 3/2007 | Franklin | A01K 95/02 43/44.91 |
| 2007/0182157 A1 * | 8/2007 | Carrier | A01K 91/04 289/17 |
| 2008/0295386 A1 * | 12/2008 | Hudson | A01K 95/02 43/44.91 |

(Continued)

FOREIGN PATENT DOCUMENTS

WO 2010039020 4/2010

*Primary Examiner* — Bao-Thieu L Nguyen
(74) *Attorney, Agent, or Firm* — Kyle A. Fletcher, Esq.

(57) ABSTRACT

The fishing knot tying device is a mechanical apparatus. The fishing knot tying device is a manually operated device. The fishing knot tying device incorporates a barrel structure, a corkscrew structure, and a cord structure. The cord structure is configured for use with fishing tackle. The corkscrew structure inserts into the barrel structure such that the corkscrew structure rotates within the barrel structure. The fishing tackle inserts into the barrel structure. The cord structure inserts through the barrel structure. The cord structure attaches to the corkscrew structure. The corkscrew structure ties a knot structure in the cord structure. The knot structure secures the cord structure to the fishing tackle.

13 Claims, 14 Drawing Sheets

(56) References Cited

U.S. PATENT DOCUMENTS

| | | | |
|---|---|---|---|
| 2009/0044441 A1* | 2/2009 | Neal | A01K 91/04 43/43.1 |
| 2014/0208630 A1* | 7/2014 | Pearcy | A01K 91/03 43/43.1 |
| 2015/0048616 A1* | 2/2015 | Mashhour | A01K 91/04 289/1.5 |
| 2023/0049724 A1* | 2/2023 | Fox | A01K 91/04 |

* cited by examiner

FISHING KNOT TYING JIG

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of connecting fishing lines to hooks or lures as well as fishing line to fishing leader connections. (A01K91/04)

SUMMARY OF INVENTION

The fishing knot tying device is a mechanical apparatus. The fishing knot tying device is a manually operated device. The fishing knot tying device comprises a barrel structure, a corkscrew structure, and a cord structure. The cord structure is configured for use with fishing tackle. References to fishing tackle include one or more items of fishing equipment selected from the group consisting of: a) a fishing hook; b) a fishing leader; and c) terminal tackle connections including fishing lures and swivels.

The corkscrew structure is placed into the barrel structure such that the corkscrew structure rotates within the barrel structure. The fishing tackle inserts into the barrel structure. The cord structure inserts through the barrel structure. The cord structure attaches to the corkscrew structure. The corkscrew structure ties a knot structure in the cord structure. The knot structure secures the cord structure to the fishing tackle.

These together with additional objects, features and advantages of the fishing knot tying device will be readily apparent to those of ordinary skill in the art upon reading the following detailed description of the presently preferred, but nonetheless illustrative, embodiments when taken in conjunction with the accompanying drawings.

In this respect, before explaining the current embodiments of the fishing knot tying device in detail, it is to be understood that the fishing knot tying device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fishing knot tying device.

It is therefore important that the claims be regarded as including such equivalent construction insofar as they do not depart from the spirit and scope of the fishing knot tying device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
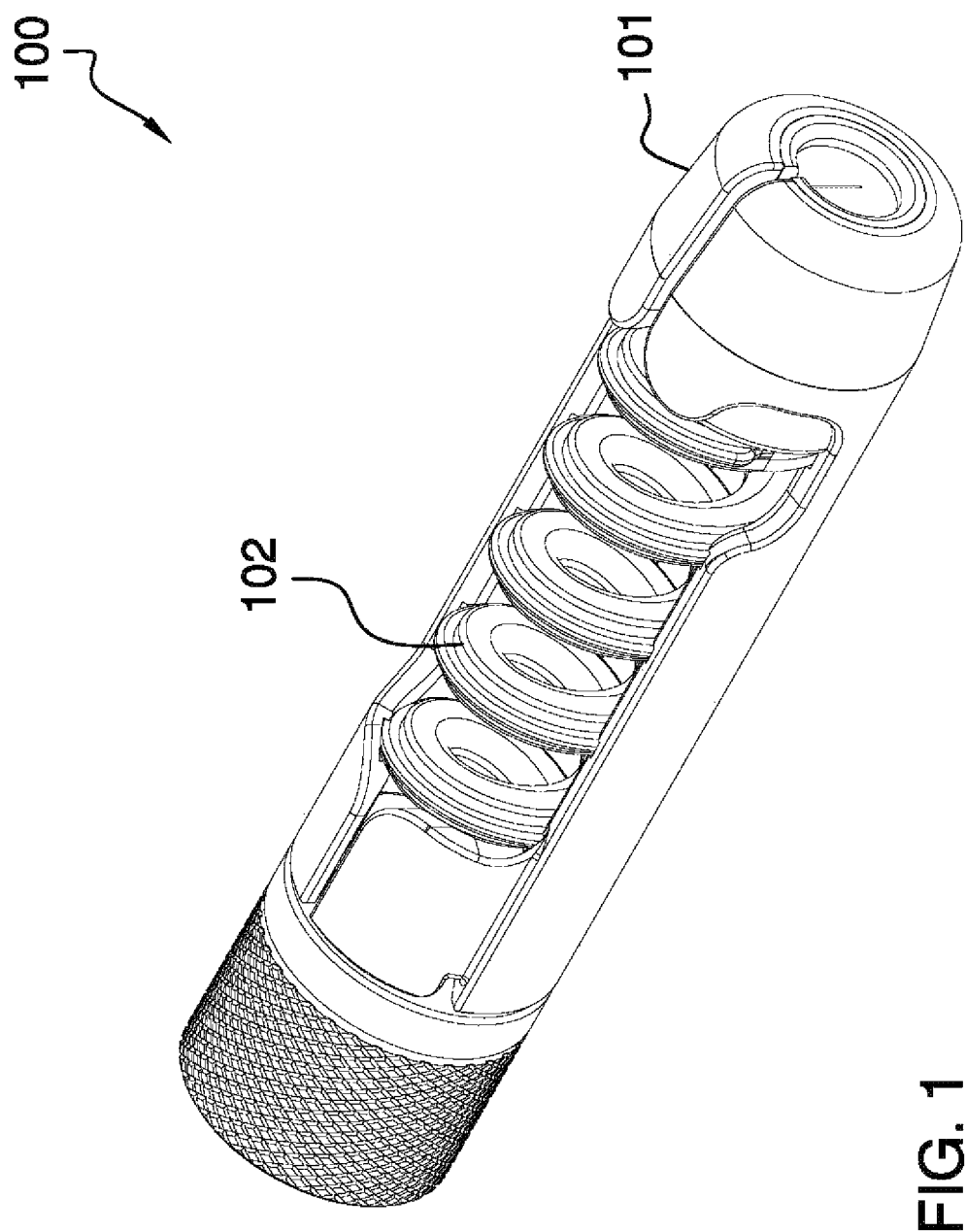
FIG. 1 is a perspective view of an embodiment of the disclosure.
Figure 2:
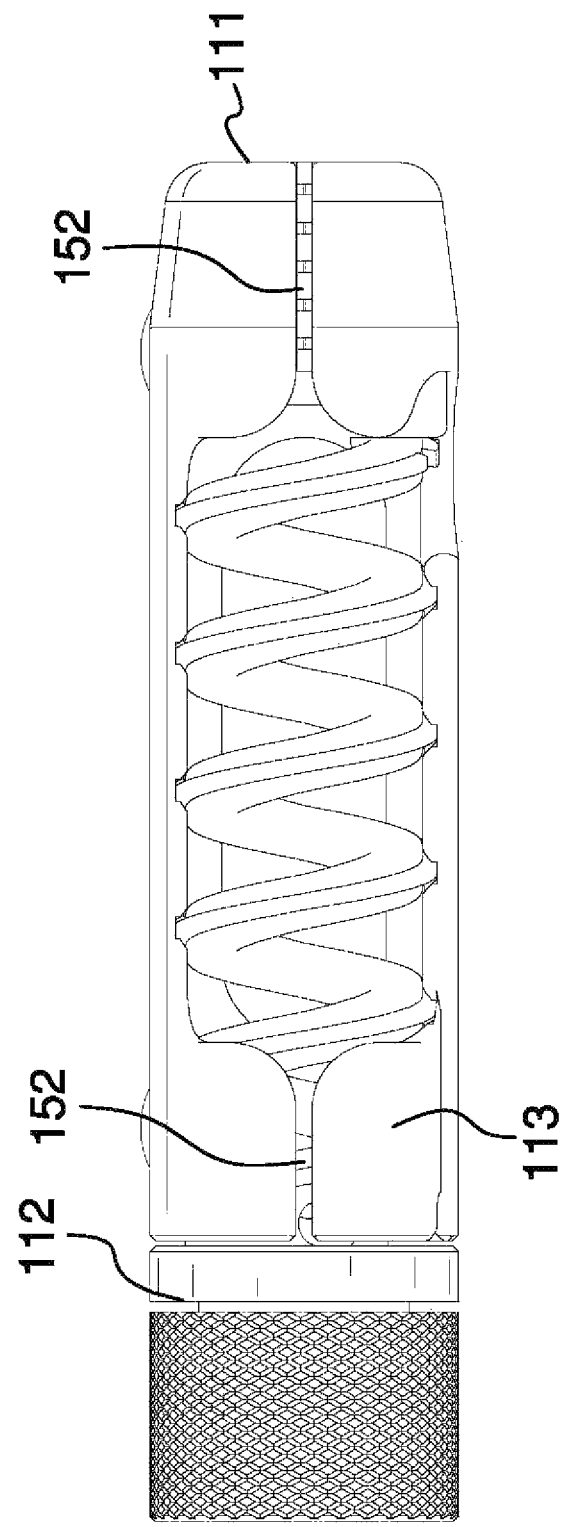
FIG. 2 is a profile view oriented with the knob at the top.
Figure 3:
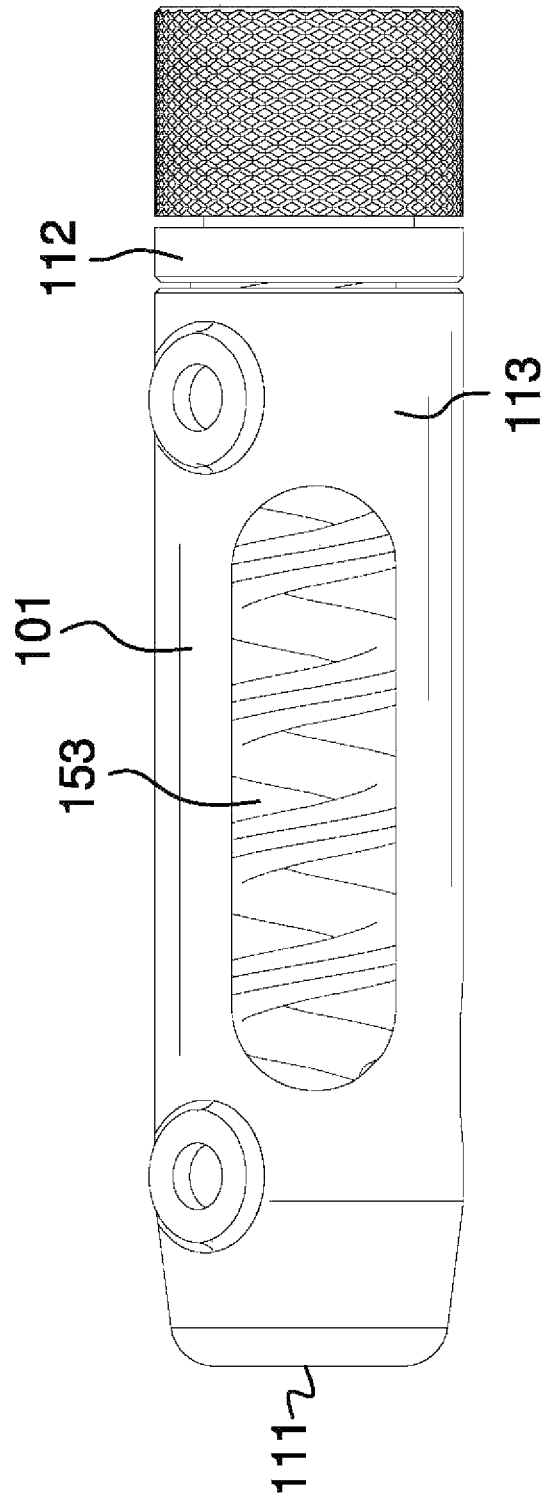
FIG. 3 is a profile view oriented with the knob at the bottom.
Figure 4:
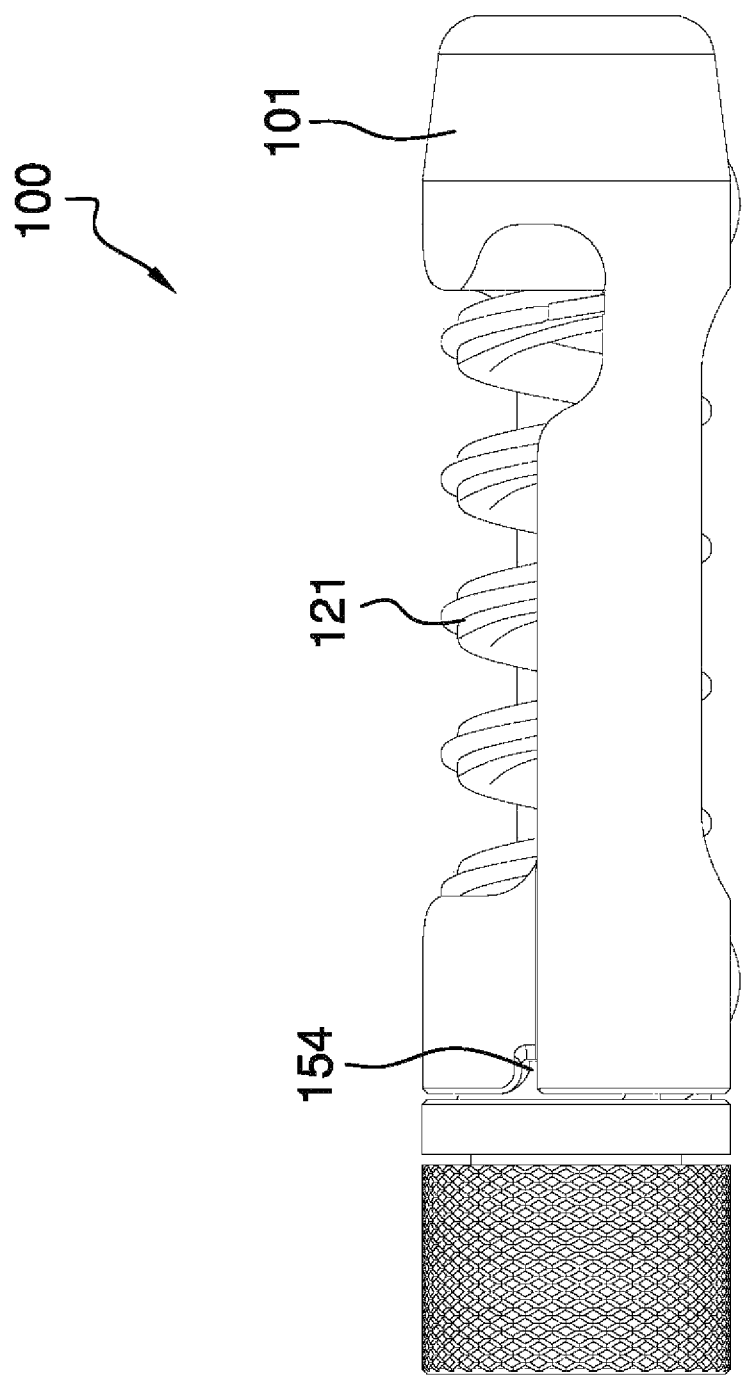
FIG. 4 is a side view of an embodiment of the disclosure.
Figure 5:
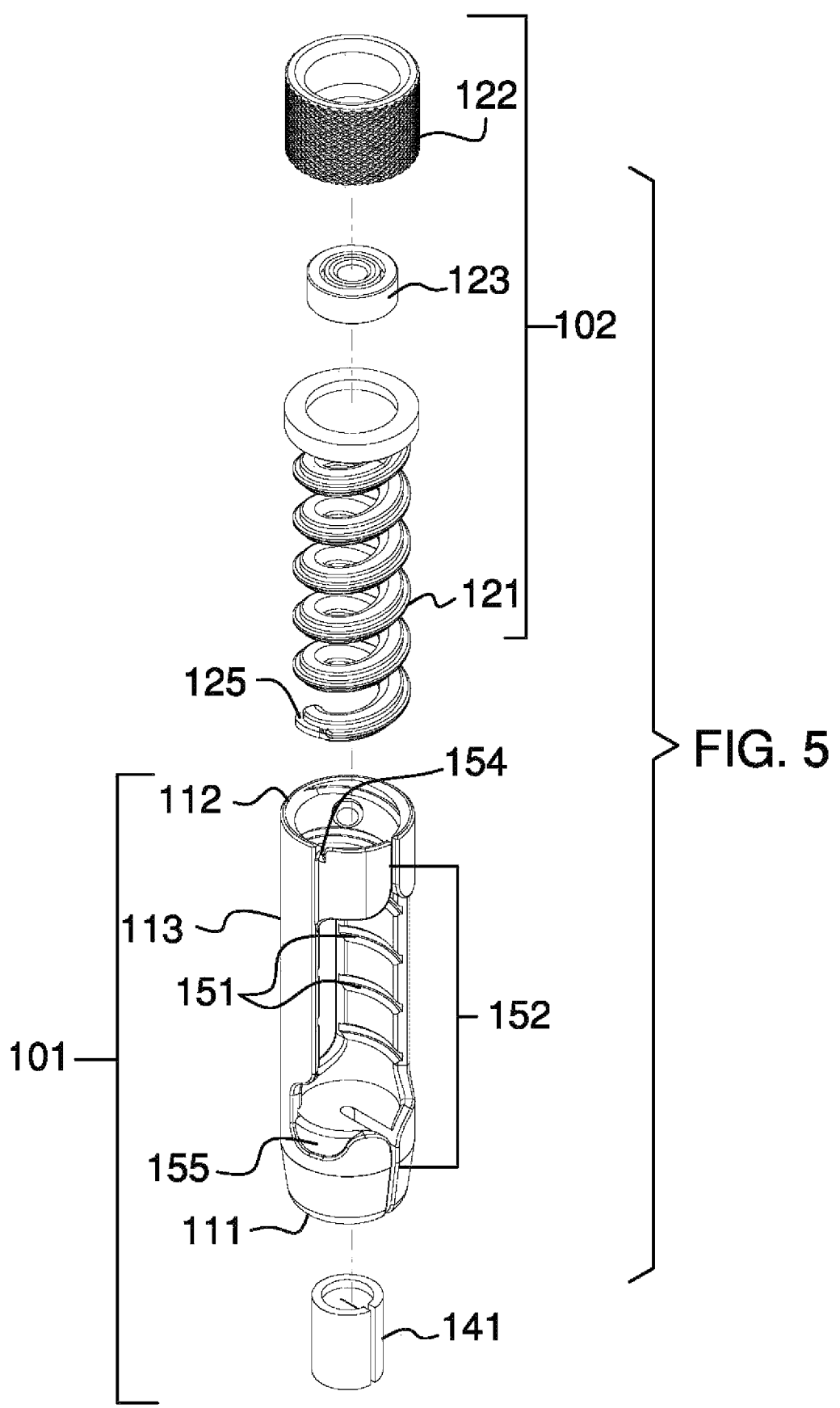
FIG. 5 is an exploded view of an embodiment of the disclosure.
Figure 6:
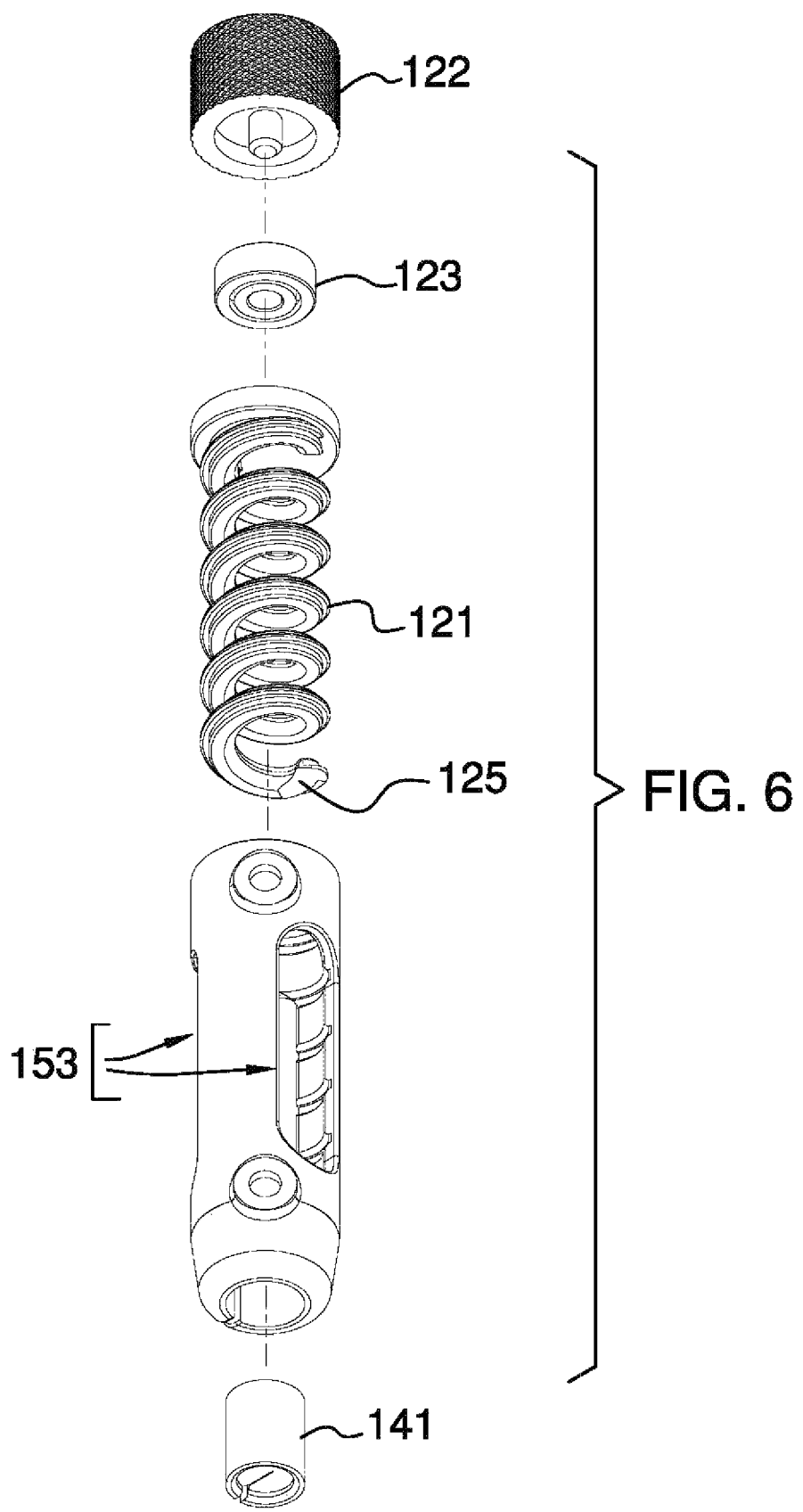
FIG. 6 is a reverse exploded view of an embodiment of the disclosure.
Figure 7:
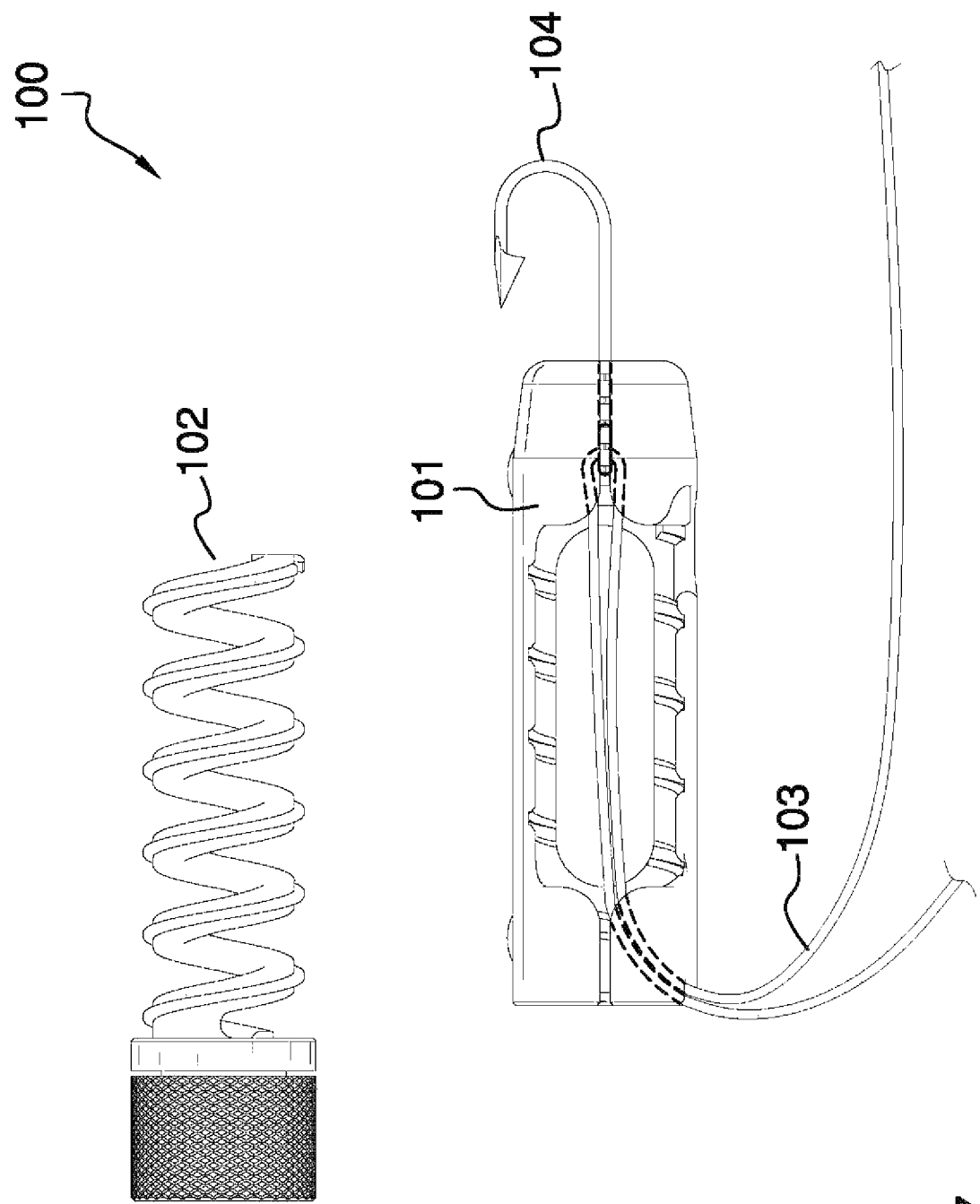
FIG. 7 is an in-use view of an embodiment of the disclosure.
Figure 8:
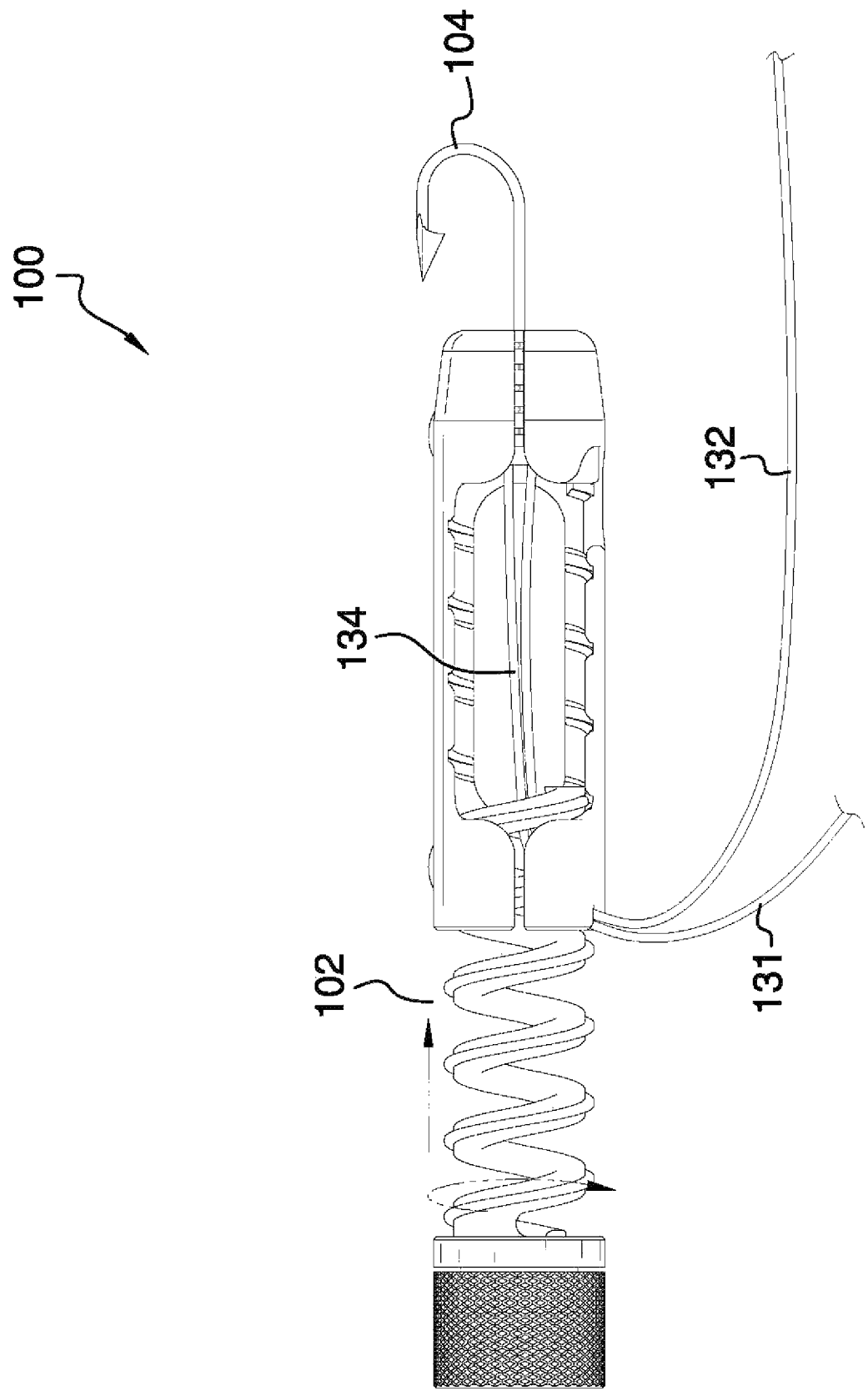
FIG. 8 is an in-use view of an embodiment of the disclosure.
Figure 9:
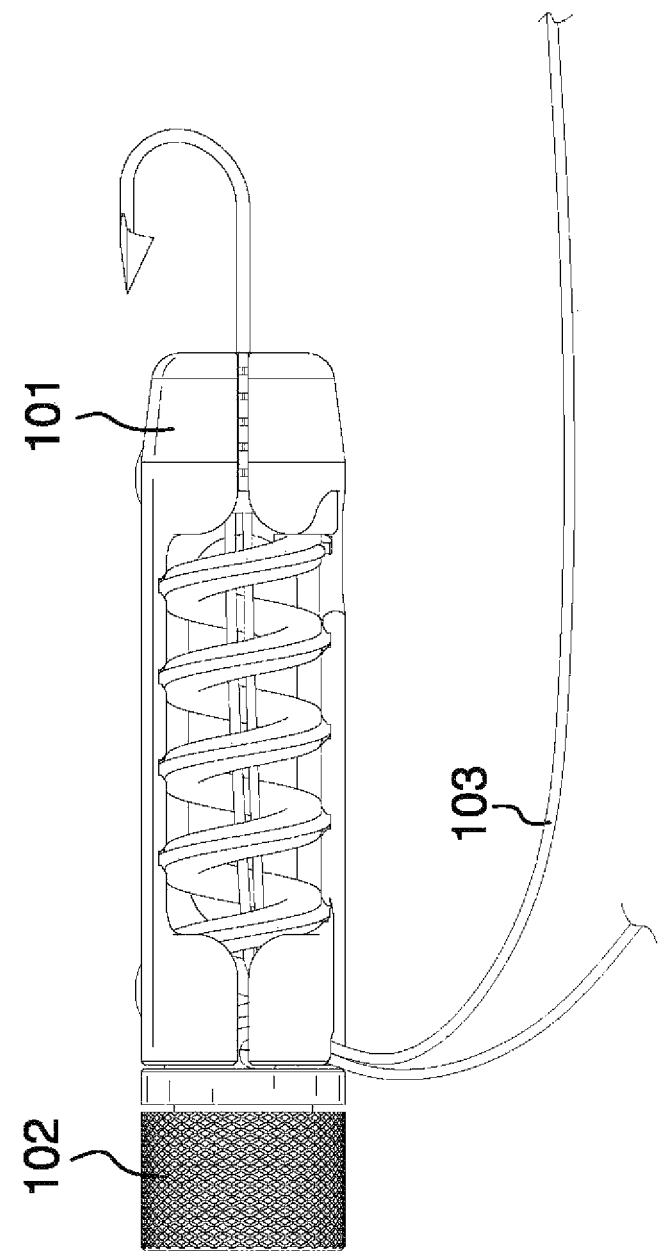
FIG. 9 is an in-use view of an embodiment of the disclosure.
Figure 10:
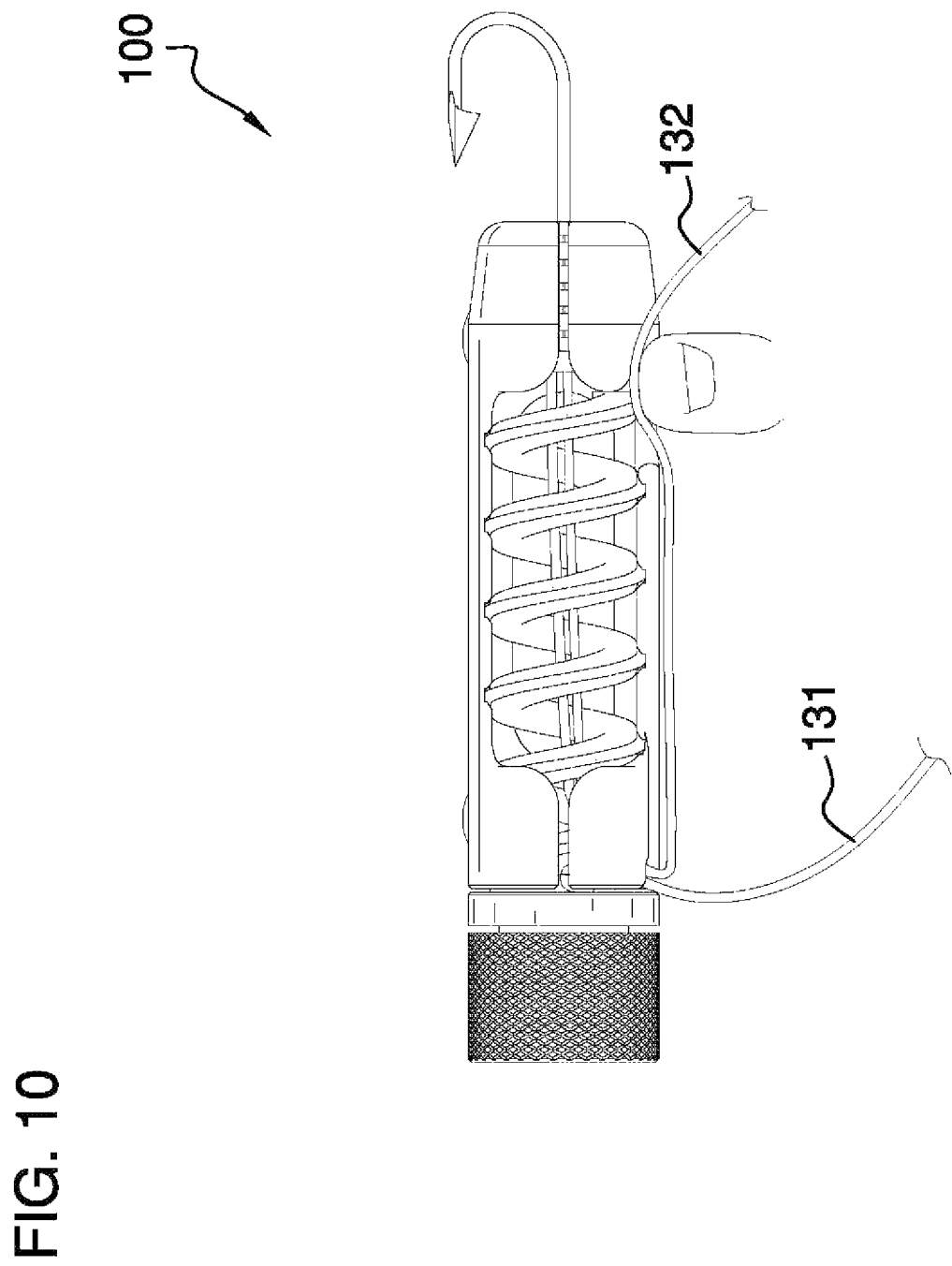
FIG. 10 is an in-use view of an embodiment of the disclosure.
Figure 11:
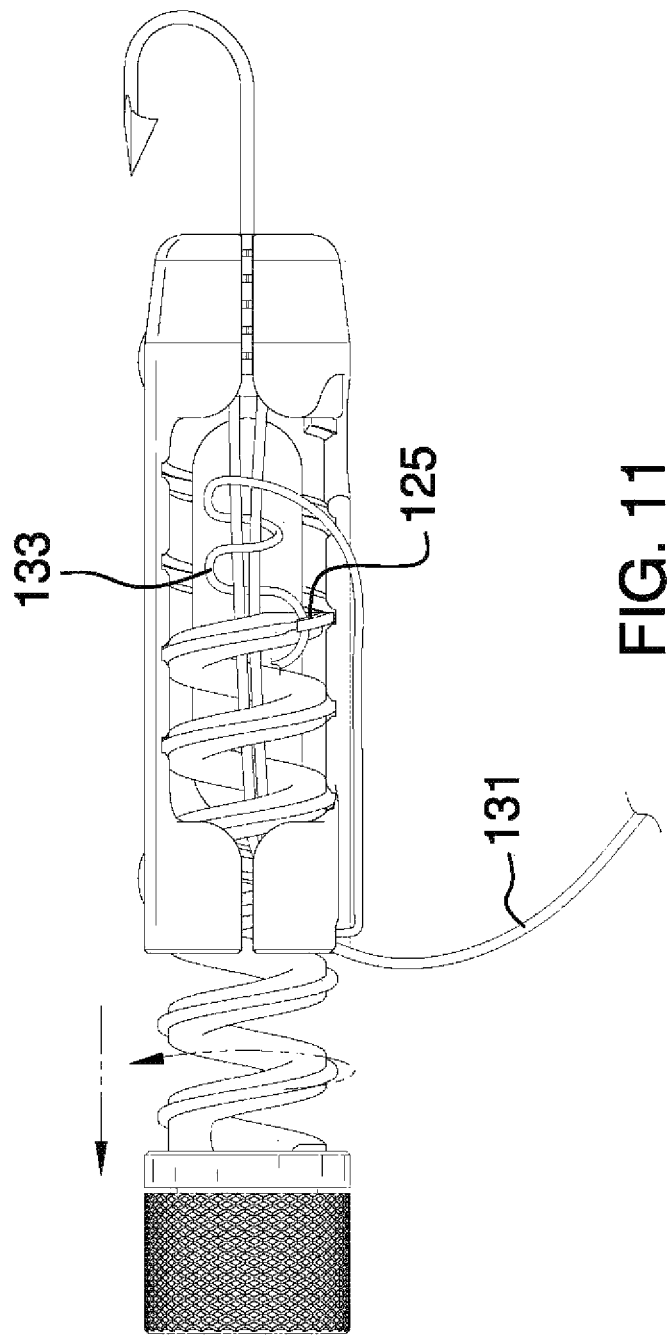
FIG. 11 is an in-use view of an embodiment of the disclosure.
Figure 12:
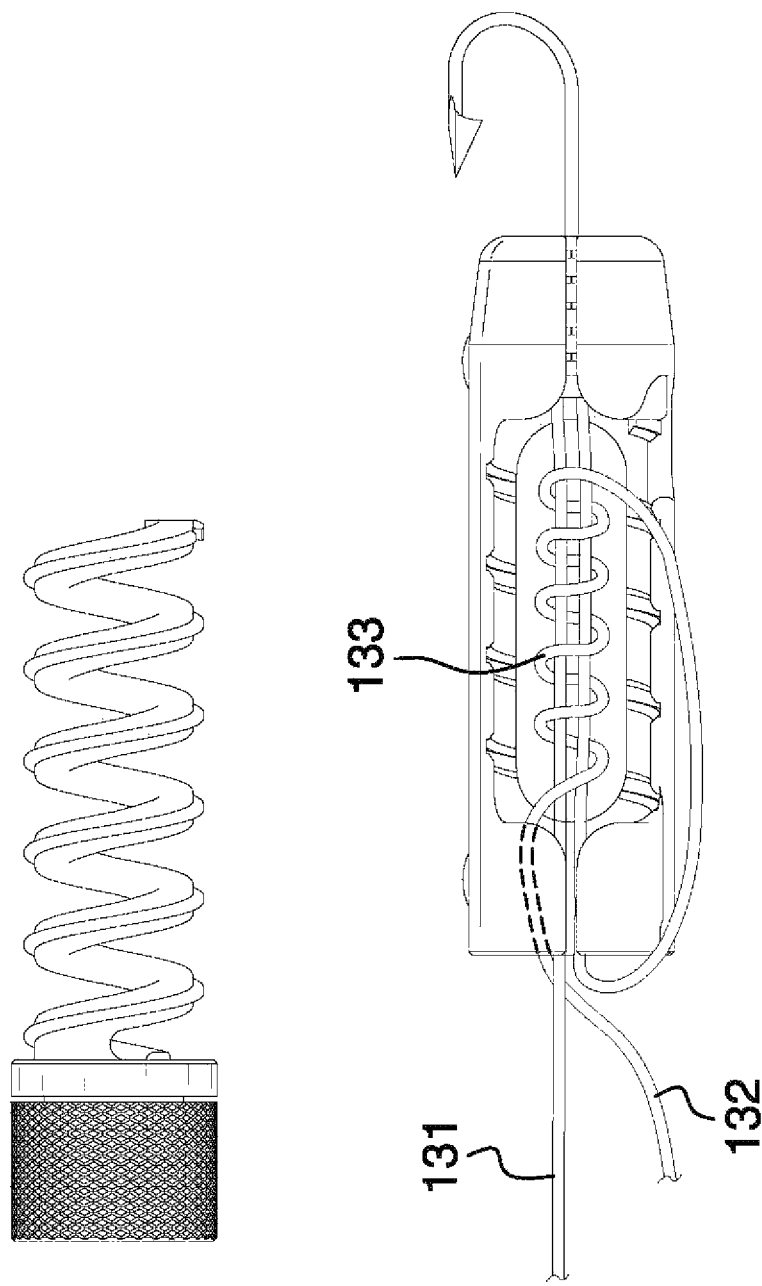
FIG. 12 is an in-use view of an embodiment of the disclosure.
Figure 13:
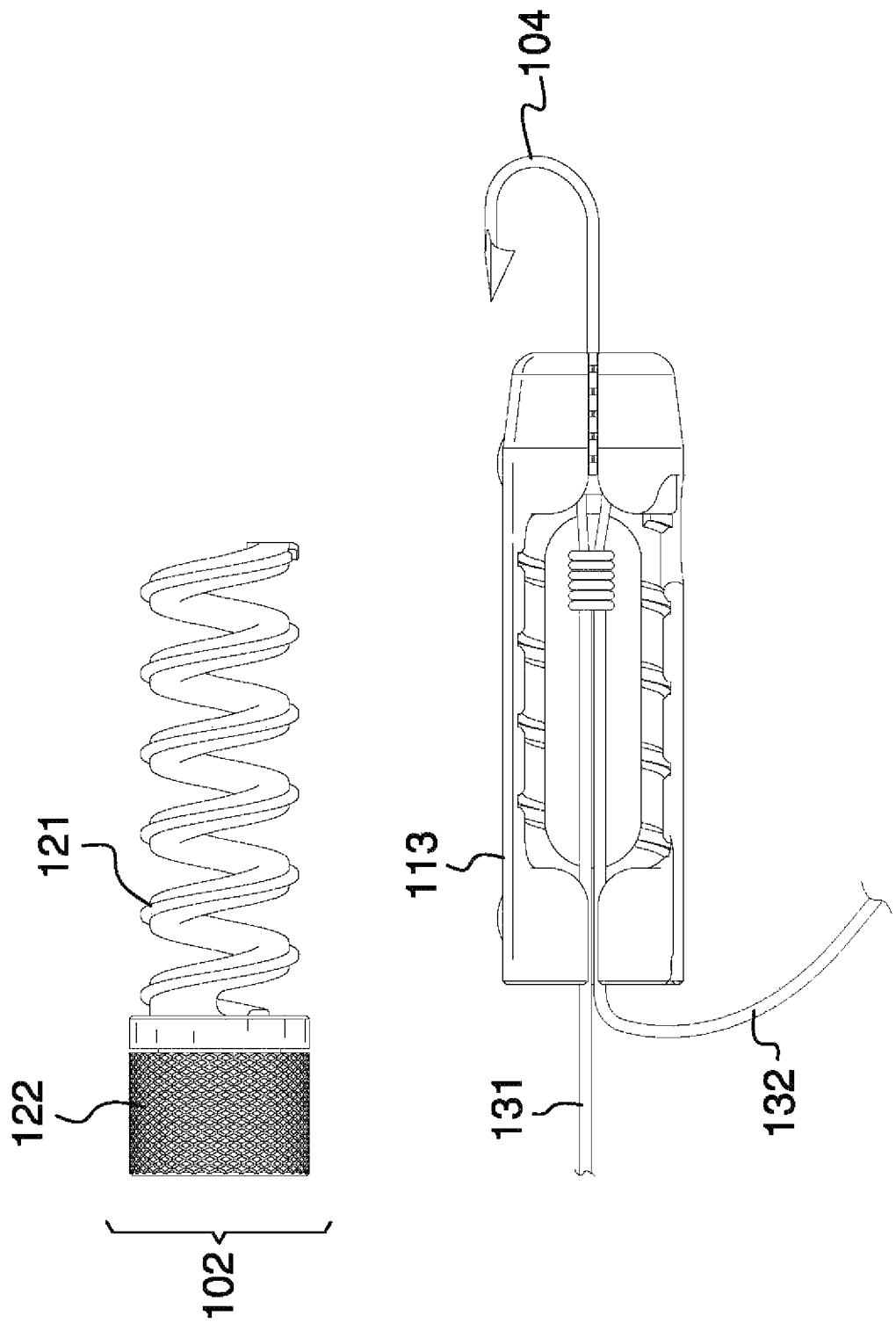
FIG. 13 is an in-use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 14.

The fishing knot tying device 100 (hereinafter invention) is a mechanical apparatus. The invention 100 is a manually operated device. The invention 100 comprises a barrel structure 101, a corkscrew structure 102, and a cord structure 103. The cord structure 103 is configured for use with fishing tackle 104. By fishing tackle 104 is meant one or more items of fishing equipment selected from the group consisting of: a) a fishing hook; b) terminal tackle, and, c) a fishing leader. The corkscrew structure 102 inserts into the barrel structure 101 such that the corkscrew structure 102 rotates within the barrel structure 101. The fishing tackle 104 inserts into the barrel structure 101. The cord structure 103 inserts through the barrel structure 101. The cord structure 103 attaches to the corkscrew structure 102. The corkscrew structure 102 ties a knot structure 133 in the cord structure 103. The knot structure 133 secures the cord structure 103 to the fishing tackle 104. The fishing tackle 104 is defined elsewhere in this disclosure.

The cord structure 103 is a cord. The cord structure 103 is formed with a tensile strength but does not have a compressive strength. The cord structure 103 forms a fishing line. The fishing line is defined elsewhere in this disclosure. The knot structure 133 is tied into the cord structure 103. The knot structure 133 secures the cord structure 103 to the fishing tackle 104. The barrel structure 101 and the corkscrew structure 102 work in conjunction to form the knot structure 133. The cord structure 103 further comprises a line side 131, a working end 132, and a knot structure 133.

The line side 131 is the bight of the fishing line that forms the cord structure 103 that runs from the knot structure 133 to the end of the cord structure 103 that is distal from the knot structure 133. The working end 132 of the fishing line that forms the cord structure 103. The working end 132 is defined elsewhere in this disclosure. The knot structure 133 is the physical knot that secures the cord structure 103 to the fishing tackle 104. In the first potential embodiment of the disclosure, the knot structure 133 is a uni-knot.

The corkscrew structure 102 is a helical structure. The corkscrew structure 102 screws into the barrel structure 101 such that the corkscrew structure 102 rotates within the barrel structure 101. The cord structure 103 attaches to the corkscrew structure 102 such that the rotation of the corkscrew structure 102 loops the cord structure 103 around itself to form the knot structure 133. The corkscrew structure 102 comprises a corkscrew 121, a knob structure 122, a bearing structure 123, and a cord anchor 125.

The corkscrew 121 is a rigid structure. The corkscrew 121 is a helical structure. The corkscrew 121 forms the physical structure that rotates within the barrel structure 101. The cord structure 103 attaches to the corkscrew 121 such that the rotation of the corkscrew 121 loops the cord structure 103 around itself to form the knot structure 133. The cord anchor 125 is an anchor point that is formed on the corkscrew 121. The cord anchor 125 is formed on the tip of the corkscrew 121 that is distal from the knob structure 122. The cord anchor 125 forms an anchor point that allows the cord structure 103 to anchor to the corkscrew 121.

The knob structure 122 is a disk shaped structure. The knob structure 122 attaches to the corkscrew 121. The knob structure 122 houses the bearing structure 123, and joins to the corkscrew 121. The knob structure 122 is sized such that the knob structure 122 does not insert into the hollow interior of the barrel structure 101. The knob structure 122 attaches to the corkscrew 121 such that the plunging motion of the knob structure 122 initiates the rotation of the corkscrew 121 within the barrel structure 101.

The corkscrew 121 attaches to a congruent end of the disk structure of the knob structure 122 such that the center axis of the helical structure of the corkscrew 121 aligns with the disk structure of the knob structure 122. The corkscrew 121 attaches to a congruent end of the disk structure of the knob structure 122 such that the center axis of the helical structure of the corkscrew 121 aligns with the center of rotation of the corkscrew structure 102 within the barrel structure 101. The corkscrew 121 attaches to a congruent end of the disk structure of the knob structure 122 such that the center axis of the helical structure of the corkscrew 121 aligns with the center axis of the barrel structure 101.

The bearing structure 123 is a rolling element bearing. The bearing structure 123 secures the corkscrew structure 102 to the interior surface of the lateral face 113 of the barrel structure 101 such that the corkscrew 121 rotates freely within the hollow interior of the barrel structure 101. The bearing structure 123 is a rolling element bearing. The bearing structure 123 secures the corkscrew structure 102 to the interior surface of the lateral face 113 of the barrel structure 101 such that the corkscrew 121 rotates freely within the hollow interior of the barrel structure 101.

The barrel structure 101 forms a semi-enclosed cylindrical shape. The barrel structure 101 is a hollow structure. The barrel structure 101 has a horizontal segment construction. The barrel structure 101 forms the primary structure of the invention 100. The corkscrew structure 102 screws into and out of the barrel structure 101. The cord structure 103 inserts through the barrel structure 101. The fishing tackle 104 inserts into the barrel structure 101. The operators plunging motion at the knob structure 122 initiates the rotation of the corkscrew 121 within the barrel structure 101. The barrel structure 101 directs the motive forces that forms the knot structure 133 that secures the cord structure 103 to the fishing tackle 104. The barrel structure 101 comprises a tackle congruent end 111, a twisting congruent end 112, and a lateral face 113.

The tackle congruent end 111 is a congruent end of the prism structure of the barrel structure 101. The tackle congruent end 111 forms an open congruent end of the tubular structure of the barrel structure 101. The tackle congruent end 111 holds the fishing tackle 104 in a fixed position as the knot structure 133 secures the cord structure 103 to the fishing tackle 104. The tackle congruent end 111 is sized to receive the fishing tackle 104. The tackle congruent end 111 further comprises a tackle mount 141.

The tackle mount 141 is a prism shaped structure. The tackle mount 141 is a tubular structure. The tackle mount 141 inserts into the tackle congruent end 111 with a tight fit. The fishing tackle 104 inserts into the tackle mount 141 with a tight fit. The tackle mount 141 secures the fishing tackle 104 to the barrel structure 101.

The twisting congruent end 112 is a congruent end of the prism structure of the barrel structure 101. The twisting congruent end 112 forms an open congruent end of the tubular structure of the barrel structure 101. The twisting congruent end 112 receives the corkscrew structure 102 into the barrel structure 101 such that the corkscrew structure 102 rotates within the barrel structure 101 as the rotation of the corkscrew structure 102 forms the knot structure 133 that secures the cord structure 103 to the fishing tackle 104. The twisting congruent end 112 is sized to receive the corkscrew structure 102. The twisting congruent end 112 is the congruent end of the barrel structure 101 that is distal from the tackle congruent end 111.

The lateral face 113 is the lateral face of the prism structure of the barrel structure 101. The lateral face 113 forms the boundaries of the semi-enclosed prism structure of the barrel structure 101. The lateral face 113 is formed with the apertures and form factors necessary to secure the corkscrew structure 102 to the barrel structure 101. The lateral face 113 is formed with the apertures and form factors necessary to receive the cord structure 103 into the barrel structure 101. The lateral face 113 further comprises a rifled slot 151, a tackle slot 152, a plurality of face apertures 153, and a cord notch 154.

The rifled slot 151 is a helical structure. The rifled slot 151 is formed on the interior surface of the lateral face 113 of the barrel structure 101. The rifled slot 151 forms an interior screw thread on the interior surface of the lateral face 113. The helical structure of the rifled slot 151 is sized such that the helical structure of the corkscrew 121 will act like an exterior screw thread such that the corkscrew 121 screws directly to the rifled slot 151 of the lateral face 113. The rifled slot 151 combines with the corkscrew 121 to form the threaded connection that secures the corkscrew structure 102 to the barrel structure 101.

The tackle slot 152 is a negative space that is formed through the lateral face 113 of the barrel structure 101. The negative space of the tackle slot 152 forms the horizontal segment structure of the barrel structure 101. The tackle slot 152 forms a negative space through the barrel structure 101 that allows the cord structure 103 to be inserted into the barrel structure 101 and the cord structure 103 removed from the hollow interior of the barrel structure 101 after the knot structure 133 attaches the cord structure 103 to the fishing tackle 104.

Each face aperture selected from the plurality of face apertures 153 is a negative space that is formed through the lateral face 113 of the barrel structure 101. Each pair of face apertures selected from the plurality of face apertures 153 are diametrically opposed. Each face aperture selected from the plurality of face apertures 153 provides access into the hollow interior of the plurality of face apertures 153.

The cord notch 154 is a negative space that is formed in the twisting congruent end 112 of the barrel structure 101. The cord notch 154 forms a negative space between the lateral face 113 of the barrel structure 101 and the knob structure 122 of the corkscrew structure 102. The cord notch 154 is sized to allow the doubled cord structure 103 to fit through the cord notch 154.

This paragraph describes the use of the invention 100. The cord structure 103 threads through the fishing tackle 104. The corkscrew structure 102 is removed from the barrel structure 101. The cord structure 103 is inserted into the barrel housing 101 via slotted openings 152. The fishing tackle 104 is inserted into the ribbed rubber tackle insert position 141. The standing lines 134 of the cord structure 103 are pulled taut, and passed out of the barrel structure 101 into the cord notch 154. The corkscrew assembly 102 is plunged into the barrel structure 101 (auto-rotation occurs due to the bearing structure 123 and the rifled slot 151 provided within the barrel structure 101). The line side 131 is pressed against the thumbpad 155. The end user pulls the corkscrew assembly 102 in order to extract the corkscrew assembly 102 from the barrel structure 101. The end user releases the cord structure 103 at the thumbpad 155 as auto-line pickup anchor point 125 engages the line side 131. The end user extracts the corkscrew assembly 102 fully and the working end 132 of the line side 131 will release from the corkscrew assembly 102 automatically. The end user pulls the working end 132 of the line side 131 to cinch the knot structure 133. The end user pulls the line side 131 to the rod 103 to seat the knot structure 133 fully. Next, extract the cord structure 103 from the barrel structure 102 via the voids in the housing 152. Trim the working end 132 to form a tag end 135 (see FIG. 14).

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Barrier: As used in this disclosure, a barrier is a physical obstacle that forms a boundary between a first space and a second space. The barrier prevents the passage of an object between the first space and the second space.

Bight: As used in this disclosure, a bight refers to any central location on a cord, rope, or line.

Cant: As used in this disclosure, a cant is an angular deviation from one or more reference lines (or planes) such as a vertical line (or plane) or a horizontal line (or plane).

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord. This definition further includes textile webbings as a type of cord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Fishing Hook: As used in this disclosure, a fishing hook is a hook with a sharpened, and often barbed, end that is used to capture a fish.

Fishing Leader: As used in this disclosure, a fishing leader is a length of cord that is a wire or monofilament cord. The fishing leader secures the fishing line to a lure or hook. The lure or hook is often connected to the fishing leader with a fishing swivel that prevents twisting of the fishing line or the fishing leader from influencing the motion of the lure or hook while in the water.

Fishing Line: As used in this disclosure, a fishing line is a monofilament cord to which a hook is attached for the purpose of capturing a fish.

Fishing Swivel: As used in this disclosure, a fishing swivel is a device used in fishing to prevent a fishing line from twisting during use.

Fitted: As used in this disclosure, the term fitted refers to two geometrically similar structures wherein the smaller geometrically similar structure inserts into the larger geometrically similar structure with a tight fit.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Horizontal Segment: As used in this disclosure, a horizontal segment refers to a prism or cylinder that is bifurcated by a single plane that is parallel to or contains the center axis of the prism or cylinder.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Knob: As used in this disclosure, a knob is a rounded structure that is mounted in the surface of an object.

Knot: As used in this disclosure, a knot is an interlacement of cord, ribbon, rope, or similar materials that is used to: 1) secure the cord, ribbon, rope, or other similar material to an object which may include, but is not limited to, a second cord, ribbon, rope, or other similar material; or, 2) prevent the cord, ribbon, rope, or other similar material from being pulled through a hole or out of a retaining device. In this disclosure, the second type of knot is referred to as a stopper knot.

Leader: As used in this disclosure, a leader is a length of cord that is a wire or monofilament cord to a fishing line to a lure or hook. The lure or hook is often connected to the leader with a swivel that prevents twisting of the fishing line or the leader from influencing the motion of the lure or hook while in the water.

Line side: As used in this disclosure, the line side refers to the end of a rope or line that forms a knot. The line side is usually the end opposite the standing end of a rope or line.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e. a north pole will attract a south pole).

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Notch: As used in this disclosure, a notch is: 1) an indentation or negative space formed in an edge; or 2) a cavity or aperture formed within a surface.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the rough overall geometric shape of an object that is assembled from multiple components or surfaces.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Screw: As used in this disclosure, to screw is a verb meaning: 1) to fasten or unfasten (unscrew) a threaded connection; or 2) to attach a helical structure to a solid structure.

Semi-Enclosed Prism: As used in this disclosure, a semi-enclosed prism is a prism-shaped structure wherein a portion of the lateral face of the prism-shaped is removed or otherwise replaced with a negative space. Always use negative space.

Standing End: As used in this disclosure, the standing end refers to the end of a rope or line that is not involved with a knot. The standing end is usually the end opposite the line side of a rope or line.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Figure 14:
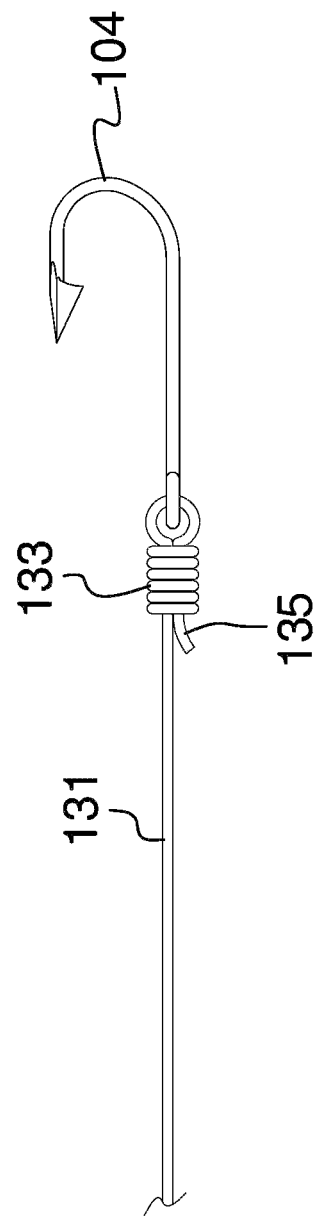
FIG. 14 is a finished knot product.

Tag End: As used in this disclosure, a tag end is the little leftover bit that gets cut to final dress the knot as depicted in FIG. 14.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Threaded Nut: As used in this disclosure, a threaded nut is a first object that is formed with a cylindrical negative space that further comprises an interior screw thread such that a second object with a matching exterior screw thread can screwed into the first object forming a threaded connection. A threaded nut is further defined with an inner dimension.

Tight Fit: As used in this disclosure, a tight fit refers to the insertion of a first object into a second object such that there is not a lot of space between the first object and the second object. By not a lot of space is meant that friction occurs when the first object moves within the second object. Use Friction and Fitted (Below).

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Working end: As used in this disclosure, a working end refers to the portion of fishing line that is manipulated to form the knot.

With respect to the above description, it is to be realized that the optimum dimensional relationship for the various components of the invention described above and in FIGS. 1 through 14 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A fishing knot tying device comprising
a barrel structure, a corkscrew structure, and a cord structure;
wherein the cord structure inserts into the barrel structure;
wherein the corkscrew structure inserts into the barrel structure;
wherein the barrel structure comprises a tackle congruent end, a twisting congruent end, and a lateral face;
wherein the lateral face further comprises a rifled slot, a tackle slot, a plurality of face apertures, and a cord notch;
wherein the rifled slot is a helical structure is formed on an interior surface of the lateral face of the barrel structure;
wherein the rifled slot forms an interior screw thread on the interior surface of the lateral face;
wherein the helical structure of the rifled slot is sized such that the helical structure of the corkscrew acts as an exterior screw thread such that the corkscrew screws directly to the rifled slot of the lateral face;
wherein the rifled slot combines with the corkscrew to form the threaded connection that secures the corkscrew structure to the barrel structure;
wherein the tackle slot is a negative space that is formed through the lateral face of the barrel structure.

2. The fishing knot tying device according to claim 1
wherein the fishing knot tying device is a mechanical apparatus;
wherein the fishing knot tying device is a manually operated device;
wherein the cord structure is configured for use with fishing tackle;
wherein the corkscrew structure inserts into the barrel structure such that the corkscrew structure rotates within the barrel structure;
wherein the fishing tackle inserts into the barrel structure.

3. The fishing knot tying device according to claim 2
wherein the cord structure inserts through the barrel structure;
wherein the cord structure attaches to the corkscrew structure;
wherein the corkscrew structure ties a knot structure in the cord structure;
wherein the knot structure secures the cord structure to the fishing tackle.

4. The fishing knot tying device according to claim 3
wherein the cord structure is a cord;
wherein the cord structure is formed with a tensile strength but does not have a compressive strength;
wherein the cord structure forms a fishing line;
wherein the knot structure is tied into the cord structure;
wherein the knot structure secures the cord structure to the fishing tackle;
wherein the barrel structure and the corkscrew structure work in conjunction to form the knot structure.

5. The fishing knot tying device according to claim 4
wherein the corkscrew structure is a helical structure;
wherein the corkscrew structure screws into the barrel structure such that the corkscrew structure rotates within the barrel structure;
wherein the cord structure attaches to the corkscrew structure such that the rotation of the corkscrew structure loops the cord structure around itself to form the knot structure.

6. The fishing knot tying device according to claim 5
wherein the barrel structure is a roughly prism shaped structure;
wherein the barrel structure forms a semi-enclosed cylindrical shape;
wherein the barrel structure is a hollow structure;
wherein the barrel structure has a horizontal segment construction;
wherein the barrel structure forms the primary structure of the fishing knot tying device;
wherein the corkscrew structure screws into and out of the barrel structure;
wherein the cord structure inserts through the barrel structure;
wherein the fishing tackle inserts into the barrel structure;
wherein a plunging motion at the knob structure initiates the rotation of the corkscrew within the barrel structure;
wherein the barrel structure directs the motive forces that forms the knot structure that secures the cord structure to the fishing tackle.

7. The fishing knot tying device according to claim 6
wherein the corkscrew structure comprises a corkscrew, a knob structure, a bearing structure, and a cord anchor;
wherein the corkscrew and the bearing structure attaches to the knob structure;
wherein the cord anchor is formed on the corkscrew.

8. The fishing knot tying device according to claim 7
wherein the tackle congruent end is a congruent end of the prism structure of the barrel structure;
wherein the tackle congruent end forms an open congruent end of the tubular structure of the barrel structure;

wherein the tackle congruent end holds the fishing tackle in a fixed position as the knot structure secures the cord structure to the fishing tackle;

wherein the tackle congruent end is sized to receive the fishing tackle;

wherein the twisting congruent end is a congruent end of the prism structure of the barrel structure;

wherein the twisting congruent end forms an open congruent end of the tubular structure of the barrel structure;

wherein the twisting congruent end receives the corkscrew structure into the barrel structure such that the corkscrew structure rotates within the barrel structure as the rotation of the corkscrew structure forms the knot structure that secures the cord structure to the fishing tackle;

wherein the twisting congruent end is sized to receive the corkscrew structure;

wherein the twisting congruent end is the congruent end of the barrel structure that is distal from the tackle congruent end;

wherein the lateral face is the lateral face of the prism structure of the barrel structure;

wherein the lateral face forms the boundaries of the semi-enclosed prism structure of the barrel structure;

wherein the lateral face is formed with the apertures and form factors necessary to secure the corkscrew structure to the barrel structure;

wherein the lateral face is formed with the apertures and form factors necessary to receive the cord structure into the barrel structure.

9. The fishing knot tying device according to claim 8 wherein the corkscrew is a rigid structure;

wherein the corkscrew is a helical structure;

wherein the corkscrew forms the physical structure that rotates within the corkscrew;

wherein the cord structure attaches to the corkscrew such that the rotation of the corkscrew loops the cord structure around itself to form the knot structure;

wherein the cord anchor is an anchor point that is formed on the corkscrew;

wherein the cord anchor is formed on the tip of the corkscrew that is distal from the knob structure;

wherein the cord anchor forms an anchor point that allows the cord structure to anchor to the corkscrew.

10. The fishing knot tying device according to claim 9 wherein the knob structure is a disk shaped structure;

wherein the knob structure attaches to the corkscrew;

wherein the knob structure rigidly attaches to the corkscrew;

wherein the knob structure is sized such that the knob structure does not insert into the hollow interior of the barrel structure;

wherein the knob structure attaches to the corkscrew such that the plunging motion of the knob structure initiates the rotation of the corkscrew within the barrel structure;

wherein the corkscrew attaches to a congruent end of the disk structure of the knob structure such that the center axis of the helical structure of the corkscrew aligns with the disk structure of the knob structure;

wherein the corkscrew attaches to a congruent end of the disk structure of the knob structure such that the center axis of the helical structure of the corkscrew aligns with the center of rotation of the corkscrew structure within the barrel structure;

wherein the corkscrew attaches to a congruent end of the disk structure of the knob structure such that the center axis of the helical structure of the corkscrew aligns with the center axis of the barrel structure.

11. The fishing knot tying device according to claim 10 wherein the bearing structure is a rolling element bearing;

wherein the bearing structure secures the corkscrew structure to the interior surface of the lateral face of the barrel structure such that the corkscrew rotates freely within the hollow interior of the barrel structure;

wherein the bearing structure is a rolling element bearing;

wherein the bearing structure secures the corkscrew structure to the interior surface of the lateral face of the barrel structure such that the corkscrew rotates freely within the hollow interior of the barrel structure.

12. The fishing knot tying device according to claim 11 wherein the tackle congruent end further comprises a tackle mount;

wherein the tackle mount is a prism shaped structure;

wherein the tackle mount is a tubular structure;

wherein the tackle mount inserts into the tackle congruent end with a tight fit;

wherein the fishing tackle inserts into the tackle mount with a tight fit;

wherein the tackle mount secures the fishing tackle to the barrel structure.

13. The fishing knot tying device according to claim 12 wherein the negative space of the tackle slot forms the horizontal segment structure of the barrel structure;

wherein the tackle slot forms a negative space through the barrel structure that allows the cord structure to be inserted into the barrel structure and the cord structure removed from the hollow interior of the barrel structure after the knot structure attaches the cord structure to the fishing tackle;

wherein each face aperture selected from the plurality of face apertures is a negative space that is formed through the lateral face of the barrel structure;

wherein each pair of face apertures selected from the plurality of face apertures are diametrically opposed;

wherein each face aperture selected from the plurality of face apertures provides access into the hollow interior of the plurality of face apertures;

wherein the cord notch is a negative space that is formed in the twisting congruent end of the barrel structure;

wherein the cord notch forms a negative space between the lateral face of the barrel structure and the knob structure of the corkscrew structure;

wherein the cord notch is sized to allow the doubled cord structure to fit through the cord notch.

\* \* \* \* \*